UNITED STATES PATENT OFFICE.

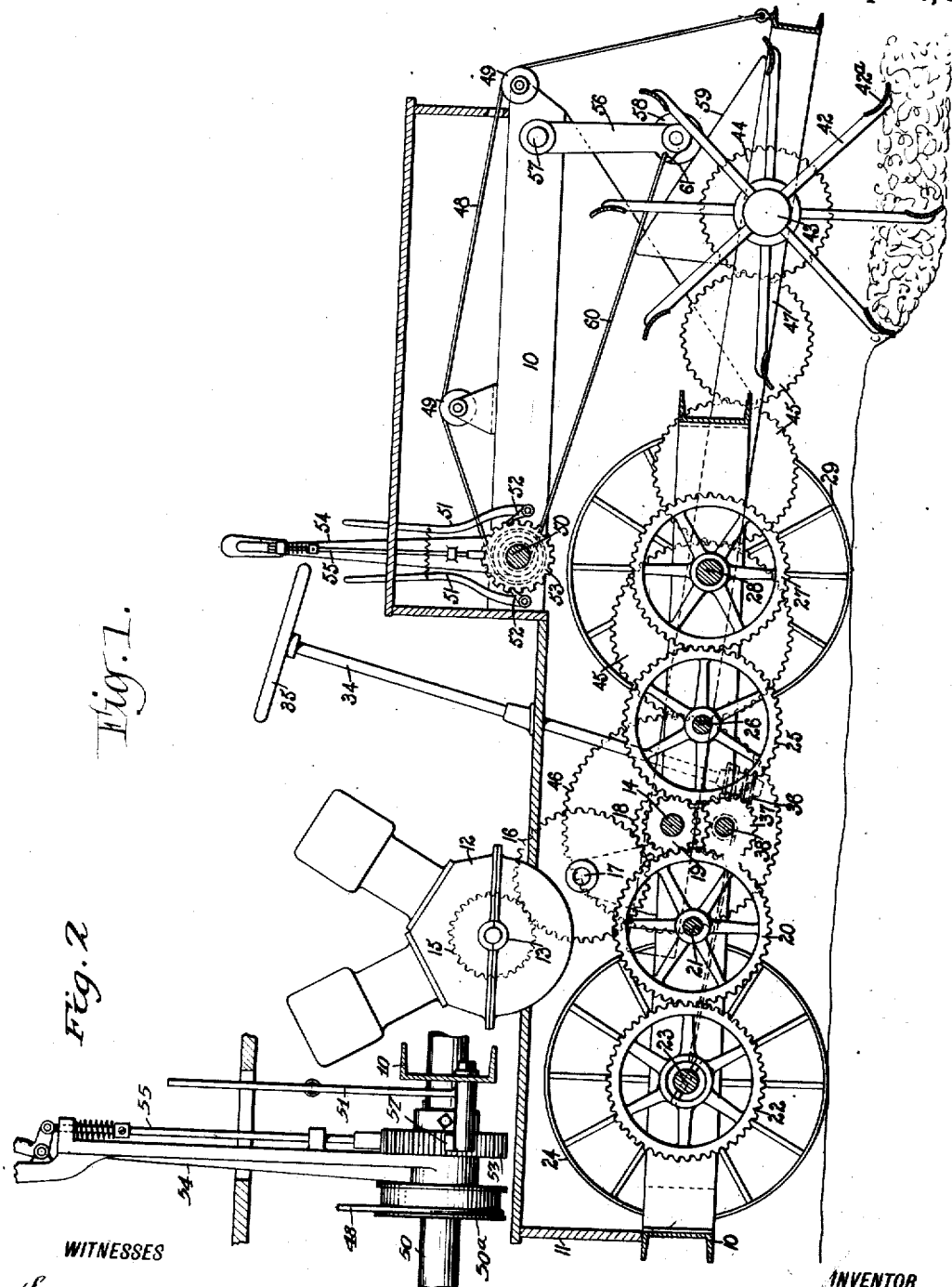

BENTON P. SHIPPY, OF LANDER, WYOMING.

ROTARY PLOW.

1,263,352.  Specification of Letters Patent.  Patented Apr. 16, 1918.

Application filed July 6, 1917. Serial No. 178,904.

*To all whom it may concern:*

Be it known that I, BENTON P. SHIPPY, a citizen of the United States, and a resident of Lander, in the county of Fremont and State of Wyoming, have invented a new and Improved Rotary Plow, of which the following is a full, clear, and exact description.

My invention relates to a tractor plow having power-driven rotary plow means, and more particularly the invention of the present application relates to a motor plow structure embodying plowing and plow-controlling means.

The prime object of the present invention is to provide a rotary plow with raising and lowering means, and means associated therewith to positively act to give a downward movement to the plowing means when lowering the same instead of relying solely on the gravity of the said plowing means.

The nature of the invention and the advantages of the structural features entering into the preferred practical embodiment thereof will more clearly appear as the description proceeds.

Reference is to be had to the accompanying drawings forming a part of this specification in which similar reference characters indicate corresponding parts in all the views, it being understood that the drawings are merely illustrative of one example of the invention.

Figure 1 is a longitudinal vertical section of a rotary tractor plow embodying my invention, the section being taken approximately at the center;

Fig. 2 is a detail front view showing the plow raising and lowering shaft and its actuating means;

In carrying out my invention in accordance with the illustrated example, a tractor is provided with a frame 10 and superstructure 11. Mounted on the same is any approved motor 12 here conventionally shown. A main drive shaft 14 is driven from the engine shaft 13 through suitable intermediate connections, there being shown gear wheels 16 mounted on a shaft 17 and meshing with a gear wheel 15 on the engine shaft 13 and with a pinion 18 on the drive shaft 14. Positive drive connections are established between the drive shaft 14 and both the front and rear axles. As one example of means for the purpose, I have illustrated a drive pinion 19 on the shaft 14 meshing with a gear wheel 20 on a shaft 21, the wheel 20 in turn meshing with a gear wheel 22 on the front axle 23 carrying the traction wheels 24. For driving the rear axle the pinion 19 meshes also with a gear wheel 25 on a shaft 26, said wheel 25 in turn meshing with a gear wheel 27 fixed on the rear axle 28 having traction wheels 29.

For steering the front axle a steering post 34 has a wheel 35 thereon and at its lower end has a worm 36 geared with a worm wheel 37 on a short shaft 38. The shaft 38 has suitable connection with axle 23, the particular steering means forming no part of the present invention.

The rotary plowing means comprises a revoluble plow in the form of a reel designated generally by the numeral 42 and having bearings at its ends 43 in a vertical rockable frame 47 which is hung at its rear end on the drive axle 14. To give rotary movement to the plow 42 a drive connection is established between said plow and the drive shaft 14. For the purpose in the illustrated construction gear wheels 44 are fixed on the plow at each end and are adapted to be driven from the drive shaft by a gear train 45 at each side of the machine. One wheel of each train is in mesh with a wheel 44 and another in mesh with a gear wheel 46 on the drive shaft, the arrangement being duplicated at each side of the machine. It will be seen that the frame 47 carrying the rotary plow 42 may swing vertically through an angle about the axis of a drive shaft 14 for raising and lowering the plow. For raising the plow 42 there is connected with the frame 47 at the front end, at the approximate center, a cable 48 which runs over suitable guide sheaves 49 to a drum 50 on a shaft 50 adapted to be manually turned by any suitable means as for example a known type of ratchet mechanism as illustrated, comprising ratchet levers 51 carrying pawls 52 engaging at opposite sides of a ratchet wheel 53 on the shaft 50. The numeral 54 indicates a latch lever having a latch 55 to engage the ratchet wheel 53 to hold the plow in a given adjustment. In order to exert a positive downward pressure on the plow frame 47 in lowering the plow, I provide swinging pressure arms 56 hung at their upper ends as at 57 on a suitable member of the frame or superstructure and carrying rollers 58 at the lower ends, there being one arm 56 at each side of the machine. The rollers 58 bear on inclines 59 on the frame 47 at each side and cables 60 connect with each arm near the lower ends as at 61 and wind on the ends of the shaft 50. The cables 48 and 60 wind reversely on the shaft. the arrangement being such that as the shaft is operated to lower the rotary plow 42, the cable 48 will be paid out while the cable 60 will be wound in thereby pressing the rollers 58 against the inclines 59 and thus positively depressing the plow. With the raising of the plow a reverse movement is given to the arms 56, since the cables 48 will be paid out permitting the inclines 59 to swing the arms outwardly that they may not interfere with the raising of the plow.

The plow 42 is provided on the outer ends of the arms and connecting the latter, with longitudinal plowing bars 42ª, the opposite edges of which are serrated whereby to readily enter and engage the ground and thoroughly break up the same. Said bars 42 are curved in cross section.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. The combination in a plow of a main frame, an auxiliary frame pivoted on the main frame to swing vertically, a cable attached to the auxiliary frame, means to control said cable to exert a lift on the said auxiliary frame or permit the same to lower, arms swingingly mounted on the main frame, inclines on the auxiliary frame against which the said arms are adapted to bear to exert a downward pressure on the said auxiliary frame, and means to swing said arms into engagement with said inclines when the auxiliary frame is being lowered.

2. The combination with a main frame, of an auxiliary frame mounted on the main frame to swing vertically, a plow on the auxiliary frame, means to exert a lifting action on the auxiliary frame or to permit the same to lower for raising or lowering the plow, swinging arms on the main frame, inclines on the auxiliary frame against which said arms are adapted to bear, and means to swing said arms to exert a downward pressure against the said inclines.

BENTON P. SHIPPY.